United States Patent [19]
Lin et al.

[11] 3,917,837
[45] Nov. 4, 1975

[54] METHOD OF USING TRANS-2-(6-AMINO-9H-PURIN-9-YL)-CYCLOPENTANOL

[75] Inventors: Yang-I Lin; Leon Goldman, both of Nanuet, N.Y.

[73] Assignee: American Cyanamid Company, Stamford, Conn.

[22] Filed: Oct. 21, 1974

[21] Appl. No.: 516,565

[52] U.S. Cl.................................. 424/253; 424/253
[51] Int. Cl.² ......................................... A61K 35/52
[58] Field of Search ................................... 424/253

[56] References Cited
OTHER PUBLICATIONS
Chem. Abst., Vol. 62-9130f, (1965).

Primary Examiner—Stanley J. Friedman
Attorney, Agent, or Firm—Edward A. Conroy, Jr.

[57] ABSTRACT

This disclosure describes compositions of matter useful as anti-inflammatory agents and the method of meliorating inflammation in mammals therewith, the active ingredient of said compositions of matter being trans-2-(6-amino-9H-purin-9-yl)cyclopentanol or the pharmacologically acceptable acid-addition salts thereof.

1 Claim, No Drawings

METHOD OF USING TRANS-2-(6-AMINO-9H-PURIN-9-YL)-CYCLOPENTANOL

BRIEF SUMMARY OF THE INVENTION

This invention relates to novel compositions of matter useful as anti-inflammatory agents. More particularly, it relates to therapeutic compositions containing trans-2-(6-amino-9H-purin-9-yl) cyclopentanol, or the non-toxic acid-addition salts thereof, which meliorate inflammation in mammals. The invention includes the new compositions of matter and the method of meliorating inflammation in mammals therewith. Trans-2-(6-amino-9H-purin-9-yl) cyclopentanol, the active ingredient of the present invention, may be represented by the following structural formula:

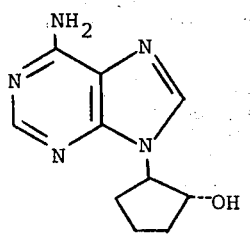

Trans-2-(6-amino-9H-purin-9-yl)cyclopentanol may be readily prepared as described by H. J. Schaeffer and R. D. Weimar, Jr., Journal of Organic Chemistry 25, 774–776 (1960).

DETAILED DESCRIPTION OF THE INVENTION

Trans-2-(6-amino-9H-purin-9-yl)cyclopentanol forms acid-addition salts with a variety of pharmaceutically acceptable organic and inorganic salt-forming reagents. Thus, acid-addition salts, formed by admixture of the base with one equivalent of an acid, suitably in a neutral solvent, are formed with such acids as sulfuric, phosphoric, hydrochloric, hydrobromic, nitric, citric, lactic, tartaric, acetic, and related acids. For purposes of this invention, the trans-2-(6-amino-9H-purin-9-yl)cyclopentanol is equivalent to its non-toxic acid-addition salts.

In determining the acute anti-inflammatory activity of trans-2-(6-amino-9H-purin-9-yl)cyclopentanol, Royal Hart, Wistar strain, rats ranging from 80 to 90 gm. were used. The rats were fasted overnight prior to dosing, but had free access to water. The drugs in aqueous solution or suspension were administered by gavage in a volume of 1.7 ml. per 50 gm. of rat (corresponds to hydration volume used by Winter, et al. Proc. Soc. Exp. Biol. Med., 111, 544–547, 1962).

The phlogistic agent used was carrageenin prepared as a sterile 1% suspension in 0.9% sodium chloride for routine testing. A volume of 0.05 ml. was injected through a 26 gauge needle into the plantar tissue of the right hind paw. Measurements were made 5 hours after drug administration (4 hours after carrageenin challenge).

Volumes of both the normal and carrageenin-inflamed feet were measured. The difference between the two measurements was considered to be the increased edema due to the carrageenin administration. Results were expressed as a C/T efficacy ratio (edema of control animals/edema of treated animals). The following Table I summarizes the results obtained with trans-2-(6-amino-9H-purin-9-yl)cyclopentanol as well as other recognized anti-inflammatory agents.

TABLE 1

The Effects of Anti-inflammatory Agents on Carrageenin Induced Edema of the Rat Paw (Pooled Data)

| Treatment | Dose mg./kg. | No. of Rats | Ratio Control/Treated Edema |
|---|---|---|---|
| Trans-2-(6-amino-9H--purin-9-yl)cyclopentanol | 250 | 8 | 2.74 |
| Aspirin | 250 | 32 | 2.8 |
| Phenylbutazone | 250 | 32 | 2.3 |
| Indomethacin | 250 | 32 | 2.9 |

Trans-2-(6-amino-9H-purin-9-yl)cyclopentanol and its non-toxic acid-addition salts have thus been found to be highly useful for meliorating inflammation in mammals when administered in amounts ranging from about 5.0 mg. to about 250.0 mg. per kilogram of body weight per day. A preferred dosage regimen for optimum results would be from about 5.0 mg. to about 100.0 mg. per kilogram of body weight per day, and such dosage units are employed that a total of from aboutt 0.35 gm. to about 7.0 gm. of the active ingredient for a subject of about 70 kg. of body weight are administered in a 24 hour period. This dosage regimen may be adjusted to provide the optimum therapeutic response. For example, several divided doses may be administered daily or the dose may be proportionally reduced as indicated by the exigencies of the therapeutic situation. A decided practical advantage of this invention is that the active ingredients may be administered in any convenient manner such as by the oral, intravenous, intramuscular, or subcutaneous routes.

Compositions according to the present invention having the desired clarity, stability and adaptability for parenteral use are obtained by dissolving from 0.10% to 10.0% by weight of active compound in a vehicle consisting of a polyhydric aliphatic alcohol or mixtures thereof. Especially satisfactory are glycerin, propylene glycol, and polyethylene glycols. The polyethylene glycols consist of a mixture of non-volatile, normally liquid, polyethylene glycols which are soluble in both water and organic liquids and which have molecular weights of from about 200 to 1500. Although the amount of active compound dissolved in the above vehicle may vary from 0.10 to 10.0% by weight, it is preferred that the amount of active compound employed be from about 3.0 to about 9.0% by weight. Although various mixtures of the aforementioned non-volatile polyethylene glycols may be employed, it is preferred to use a mixture having an average molecular weight of from about 200 to about 400.

In addition to the active compounds, the parenteral solutions may also contain various preservatives which may be used to prevent bacterial and fungal contamination. The preservatives which may be used for these purposes are, for example, myristyl-gamma-picolinium chloride, phenyl mercuric nitrate, benzalkonium chloride, phenethyl alcohol, p-chlorophenyl-α-glycerol ether, methyl and propyl parabens, and thimerosal. As a practical matter it is also convenient to employ antioxidants. Suitable antioxidants include, for example, sodium bisulfite, sodium metabisulfite, and sodium formaldehyde sulfoxylate. Generally, from about 0.05 to about 0.2% concentrations of antioxidant are employed.

For intramuscular injection, the preferred concentration of active compound is 0.25 to 0.50 mg./ml. of the finished compositions. They are equally adapted to intravenous administration when diluted with water or diluents employed in intravenous therapy such as isotonic glucose in appropriate quantities. For intravenous use, initial concentrations down to about 0.05 to 0.25 mg./ml. of active compound are satisfactory.

The active compounds of the present invention may be orally administered, for example, with an inert diluent or with an assimilable edible carrier, or they may be enclosed in hard or soft shell gelatin capsules, or they may be compressed into tablets, or they may be incorporated directly with the food of the diet. For oral therapeutic administration, the compounds may be incorporated with excipients and used in the form of tablets, troches, capsules, elixirs, suspensions, syrups, wafers, and the like. Such compositions and preparations should contain at least 0.1% of active compound. The percentage of the compositions and preparations may, of course, be varied and may conveniently be between about 2 to about 60% of the weight of the unit. The amount of active ingredient in such therapeutically useful compositions is such that a suitable dosage will be obtained. Preferred compositions or preparations according to the present invention are prepared so that an oral dosage unit form contains between about 50 and 250 milligrams of active compound.

The tablets, troches, pills, capsules and the like may also contain the following: a binder such as gum tragacanth, acacia, corn starch or gelatin; and excipient such as dicalcium phosphate; a disintegrating agent such as corn starch, potato starch, alginic acid and the like; a lubricant such as magnesium stearate; and a sweetening agent such as sucrose, lactose or saccharin may be added or a flavoring agent such as peppermint, oil of wintergreen, or cherry flavoring. When the dosage unit form is a capsule, it may contain, in addition to materials of the above type, a liquid carrier such as a fatty oil. Various other materials may be present as coatings or to otherwise modify the physical form of the dosage unit. For instance, tablets, pills or capsules may be coated with shellac, sugar or both. A syrup or elixir may contain the active compounds, sucrose as a sweetening agent, methyl and propylparabens as preservatives, a dye and flavoring such as cherry or orange flavor. Of course, any material used in preparing any dosage unit form should be pharmaceutically pure and substantially non-toxic in the amounts employed.

The invention will be described in greater detail in conjunction with the following specific examples.

EXAMPLE 1

Preparation of 50 mg. Tablets

| Per Tablet | | Per 10,000 Tablets |
|---|---|---|
| 0.050 gm. | Trans-2-(6-amino-9H--purin-9-yl)cyclo-pentanol | 500 gm. |
| 0.080 gm. | lactose | 800 gm. |
| 0.010 gm. | Corn starch (for mix) | 100 gm. |
| 0.008 gm. | Corn starch (for paste) | 80 gm. |
| 0.0015 gm. | Magnesium stearate | 15 gm |
| 0.1495 | | 1495 gm. |

The active ingredient, lactose and corn starch (for mix) are blended together. The corn starch (for paste) is suspended in 600 ml. of water and heated with stirring to form a paste. This paste is then used to granulate the mixed powders. Additional water is used, if necessary. The wet granules are passed through a number 8 hand screen and dried at 120°F. The dry granules are then passed through a number 16 screen. The mixture is lubricated with 1% magnesium stearate and compressed into tablets in a suitable tableting machine.

EXAMPLE 2

Preparation of Oral Syrup

| Ingredient | Amount |
|---|---|
| Trans-2-(6-amino-9H-purin-9-yl)-cyclopentanol hydrochloride | 500 mg. |
| Sorbitol solution (70% N.F.) | 40 ml. |
| Sodium benzoate | 150 mg. |
| Saccharin | 10 mg. |
| Red dye (F.D. & C. No. 2) | 10 mg. |
| Cherry flavor | 50 mg. |
| Distilled water q.s. ad | 100 ml. |

The sorbitol solution is added to 40 ml. of distilled water and the active ingredient is suspended therein. The saccharin, sodium benzoate, flavor and dye are added and dissolved in the above solution. The volume is adjusted to 100 ml. with distilled water. Each milliliter of syrup contains 5 mg. of drug.

Other ingredients may replace those listed in the above formulation. For example, a suspending agent such as bentonite magma, tragacanth, carboxymethylcellulose or methylcellulose may be used. Phosphates, citrates or tartrates may be added as buffers. Preservatives may include the parabens, sorbic acid and the like and other flavors and dyes may be used in place of those listed above.

EXAMPLE 3

Preparation of Parenteral Solution

In a solution of 700 ml. of propylene glycol and 200 ml. of water for injection is dissolved 20.0 gm. of trans-2-(6-amino-9H-purin-9-yl)cyclopentanol with stirring. After dissolution is complete, hydrochloric acid is added to adjust the pH to 5.5 and the volume is made up to 1000 ml. with water for injection. This formulation is filtered through a 0.22 micron sterilizing filter, filled into 5.0 ml. ampoules, each containing 2.0 ml. (representing 40 mg. of drug), and sealed under nitrogen.

We Claim:

1. The method of meliorating inflammation in a mammal which comprises administering internally to said mammal an effective amount of a compound selected from the group consisting of trans-2-(6-amino-9H-purin-9-yl)cyclopentanol and a non-toxic pharmaceutically acceptable acid-addition salt thereof.

* * * * *